(12) United States Patent
Wolf et al.

(10) Patent No.: US 7,242,112 B2
(45) Date of Patent: Jul. 10, 2007

(54) CONTROL ELEMENT OR SWITCHING ELEMENT FOR VEHICLES

(75) Inventors: Juergen Wolf, Villingen-Schwenningen (DE); Ulrich Kraus, Villingen-Schwenningen (DE)

(73) Assignee: Siemens AG, München (DE)

( * ) Notice: Subject to any disclaimer, the term of this patent is extended or adjusted under 35 U.S.C. 154(b) by 93 days.

(21) Appl. No.: 10/942,881

(22) Filed: Sep. 17, 2004

(65) Prior Publication Data

US 2005/0030166 A1   Feb. 10, 2005

Related U.S. Application Data

(63) Continuation of application No. PCT/DE03/00505, filed on Feb. 18, 2003.

(30) Foreign Application Priority Data

Mar. 18, 2002   (DE) ................. 102 11 946

(51) Int. Cl.
*B23K 11/24* (2006.01)
*H02B 1/24* (2006.01)

(52) U.S. Cl. ....................... 307/112; 318/628

(58) Field of Classification Search ............... 307/112; 180/446; 318/628
See application file for complete search history.

(56) References Cited

U.S. PATENT DOCUMENTS

| | | | |
|---|---|---|---|
| 5,080,207 A | | 1/1992 | Horneffer |
| 6,285,279 B1 * | | 9/2001 | Yamazaki ............ 340/432 |
| 6,327,932 B1 * | | 12/2001 | Onodera et al. ........... 74/552 |
| 6,768,962 B2 * | | 7/2004 | Bullinger et al. .......... 702/139 |

FOREIGN PATENT DOCUMENTS

| | | |
|---|---|---|
| DE | 3822193 A1 | 1/1990 |
| DE | 19507956 A1 | 9/1996 |
| DE | 19545392 A1 | 6/1997 |
| DE | 19545848 A1 | 6/1997 |
| DE | 19625730 A1 | 1/1998 |
| DE | 19730791 A1 | 1/1999 |
| DE | 19919216 A1 | 11/2000 |
| DE | 10001263 A1 | 7/2001 |
| DE | 19959576 A1 | 7/2001 |
| DE | 10026498 A1 | 11/2001 |
| EP | 0348691 A2 | 1/1990 |
| EP | 0856432 A3 | 8/1998 |

OTHER PUBLICATIONS

Derwent-Abstract—EP0348691A2; Jan. 3, 1990; Robert Bosch GmbH, D-70442 Stuttgart (Germany).

(Continued)

*Primary Examiner*—Brian Sircus
*Assistant Examiner*—Carlos Amaya

(57) ABSTRACT

Disclosed is a control element or switching element that is provided with elements which electrically or chemically respond to the sense of touch, for example in a steering wheel. The elements are used for supplying the driver who touches the elements with warnings and/or information about the state of the vehicle or traffic. Interactive functions can be connected thereto, by means of which replies by the driver can be detected and processed. The driver can consequently cause the information system of the vehicle to also represent the warning information in an optical manner, e.g. in corresponding control lights on the dashboard, at a desired time.

17 Claims, 1 Drawing Sheet

OTHER PUBLICATIONS

Derwent Abstract—DE10026498A1; Nov. 29, 2001; ZF Zahnradfabrik Friedrichshafen AG, D-88046 Friedrichshafen (Germany).

Derwent-Abstract—DE19625730A1; Jan. 2, 1998; ITT Automotive Europe GmbH, D-80488 Frankfurt (Germany).

Derwent-Abstract—DE10001263A1;Jul. 19, 2001; DaimlerChrysler AG, D-705678 Stuttgart (Germany).

Derwent-Abstract—DE19730791A1;Jan. 21, 1999; Robert Bosch GmbH, D-70469 Stuttgart (Germany).

Derwent-Abstract—DE3822193A1;Jan. 4, 1990; Robert Bosch GmbH; D-7000 Stuttgart (Germany).

Derwent-Abstract—DE19507956A1;Sep. 12, 1996; Daimler-Benz Aktiengesellschaft, D-70567 Stuttgart (Germany).

Derwent-Abstract—DE19919216A1;Nov. 16, 2000; DaimlerChrysler AG, D-70567 Stuttgart (Germany).

Derwent-Abstract—DE19959576A1;Jul. 5, 2001;Leopold Kostal GmbH & Co KG, D-58507 Lüdenscheid (Germany).

Derwent-Abstract—DE19545848A1;Jun. 12, 1997; Olympia Design GmbH, D-26419 Schortens; Hans Hundt, D-26180 Rastede; Günter Lüttich, D-22765 Hamburg.

Derwent-Abstract—DE19545392A1;Jun. 12, 1997; Gabriele Scheugenpflug-Leibig, D-861999 Augsburg; Johanna Lorenz, D-83684 Tegernsee.

Jutta Perkert, "Computer erkennt Gesicht", bild der wissenschaft online; Oct. 31, 2002;http://warpsix.dva.de/sixcms/detail.php?id=75514.

* cited by examiner

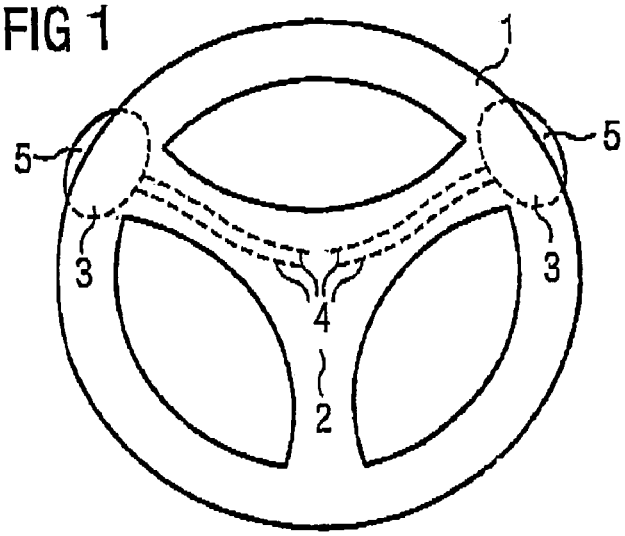
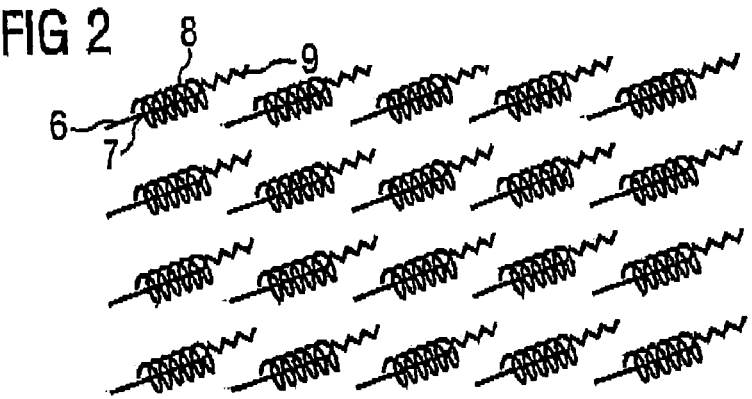
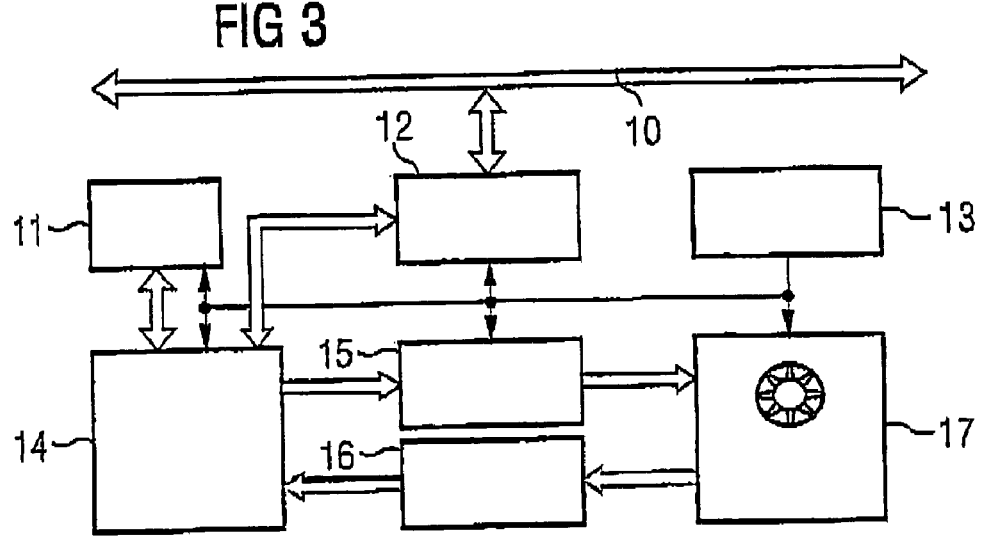

CONTROL ELEMENT OR SWITCHING ELEMENT FOR VEHICLES

CROSS REFERENCE TO RELATED APPLICATIONS

The present application is a continuation of international patent application PCT/DE03/00505, tiled Feb. 18, 2003, and claims priority to Germnan patent application DE10211946.5, tiled Mar. 18, 2002, the both of which are herein incorporated by reference.

BACKGROUND OF THE INVENTION

In motor vehicles a series of information systems is installed which comprise a specific sensor or detector and associated display which is usually installed in the dashboard. Such displays are the speedometer, the temperature display of the cooling system, fuel tank display, oil pressure warning lamp, engine speed meter and a series of monitoring lights for the parking brake, doors which are open and the like. In addition there is a series of proposals for displaying general hazardous situations in the field of vision of the driver. These include displays which relate to distance warning systems (distance radar) and the like.

The disadvantage of such systems is that movements of the head and eyes are necessary in order to detect the visual signals and intellectual effort has to be expended since in an individual case it is necessary to recognize which hazardous situation or which deficiencies of the vehicle are being indicated by the respective display. In each case, the driver is distracted, or his attention is at least briefly impaired, by the perception of a visual display and the assignment of its significance. This results in a prolonged reaction time to changed traffic conditions. This is associated with considerable disadvantages in particular when driving in the dark or in the rain.

It is known from toys and gaming machines that haptic impressions can also be conveyed in addition to visual impressions. However, in gaming machines such (haptic) stimulations which relate to the sense of touch and sensory perceptions are as :a rule snot conveyed at the same time as the visual impressions. For this reason, such haptic stimulations are not a supplement to the visual impression but rather additionally induced sense impressions which are perceived as a consequence of or as an accompanying circumstance of the visual impressions.

On an Internet website www.wissenschaft.de/sixcms, "bild der wissenschaft online", a technical report was published on Mar. 11, 2001 which describes how vehicle monitoring systems in the field of passenger car safety can be configured by means of a computer. In this context, the closing of the eyelids and the movements of the eyes of the driver are monitored and possible accidents as a result of the driver sleeping for a few seconds are prevented or other adverse effects on the driver are avoided. The system has what is referred to as a face model. It compares stored and current facial structures pixel by pixel with various resolutions. As a result, faces or parts of the face can be determined and compared with stored data.

SUMMARY OF THE INVENTION

The object of the present invention is to specify a device for transmitting warning instructions and the like to the driver of a vehicle, the use of which device distracts the driver from observing the traffic as little as possible.

This object is achieved by means of a control element or switching element having a haptic information element having the features of claim 1 and by means of the arrangements of a control element or switching element having the features of claims 9 and 10. Configurations emerge from the dependent claims.

In the control element or switching element of the vehicle which is equipped with a haptic information element, means which stimulate the sense of touch mechanically, chemically or electrically are present in an operator control element for controlling or for switching a vehicle or vehicle component, said means being used to supply the driver who is in contact with these means with warnings and/or information about the state of the vehicle or the traffic. These means which stimulate the sense of touch are preferably integrated into the steering wheel or other wheels, handles or levers which are provided for controlling or switching and which form the actual control element or switching element.

More wide-ranging configurations of the control element or switching element provide for interactive functions to be connected to the integrated information element and for responses of the driver to the given information to be sensed and processed. In particular it is possible to provide for the driver to cause the information system of the vehicle also to represent the respective warning instructions at the desired time in a visual fashion, for example in corresponding monitoring lamps of the dashboard. The viewing direction of the driver is thus not distracted by red monitoring lamps lighting up; instead, the driver experiences, as a result of the haptically transmitted information, that a particular condition has occurred and he can cause the respective information to be represented visually, and read it from the display of the dashboard, at a moment at which the events on the road do not take up his entire attention.

The basic design of a control element or switching element having an integrated, in particular interactive, haptic information element preferably comprises four components, specifically an actuator element, if appropriate a sensor element, a housing and an electronic actuation unit. The actuator element has the function of generating stimulations which are analogous to the information to be transmitted and which can be registered by means of the sense of touch of the driver's hand. This can be effected by means of pressure, pulling, electrical voltage or by changing the chemical surface quality of the actuator.

A sensor element which is provided for an interactive function has the purpose of detecting the compressive and pulling movements as well as changes in the resistance of the skin and of converting them into analogous electrical signals. These signals are used to actuate the control element and form, if appropriate, the basis for further data processing.

The sensor element and the actuator element may form one unit. Such an element may comprise, for example, an electromagnetically moved coil former with an iron core which absorbs a relatively high current when a compressive resistance, which is opposed to an initially excited movement, occurs. This change in current is evaluated and made available to the actuation unit as a signal. The compressive resistance can be exerted on the combined actuator/sensor element by the driver in response to haptic information.

The housing of the control element or switching element is preferably a component of a steering wheel, of a control lever or switching lever or the like. In a utility vehicle, in which a vehicle component such as, for example, gripper arms, are moved by means of control levers, it is possible to communicate whether the respectively moved component is being moved into an inadmissible state (for example pressure overloading on grippers), by transmitting information which can be sensed haptically. In particular when controlling gripping arms, excavators, shovels and the like it is necessary to carry out continuous visual monitoring of the direction and speed of the movement so that it is of particular advantage here if the driver does not need to simultaneously also monitor visual displays within the vehicle.

The transmission of all the necessary data records such as actuator pulses, sensor data, respectively active actuator regions and sensor regions and the like is preferably carried out by means of a suitable network. Examples of a haptic transmission of information are a) Load change detection: Acceleration monitors signal a risk of skidding which is parameterized in accordance with the load change gradient, when there are critical load change reactions of the vehicle, via the system. These gradients are communicated to the driver by means of vibrations in the corresponding half of the steering wheel which pulsate to a greater or lesser extent.

b) Ice monitor: Ice monitors signal the risk of black ice via the haptic sensor when there is frost and a high speed. The haptic signal increases in strength as the speed increases.

c) Distance warner: When the vehicle undershoots a safety distance from the vehicle traveling in front, a distance warning system outputs signals which pulsate differently depending on the distance measured.

d) Systems for detecting the edge of the roadway: When the correct marking on the roadway or the centre line is crossed, a system for detecting the edge of the roadway outputs warning signals into the left-hand or right-hand half of the steering wheel via the haptic control element. The warning signals become more intensive the closer the vehicle comes to the edge of the roadway.

e) Biometric driver monitoring systems: Driver monitoring systems detect the closing of the eyelids and the movement of the eyes and output unpleasant stimulation pulses to the driver via the haptic information element if he falls asleep for a few seconds. The intensity of the pulses increases as the attentiveness of the driver decreases.

Possible exemplary embodiments of the sensor and actuator systems which are suitable for the haptic information element are, in particular, pressure needle systems, extension needle systems and eccentric systems. In the case of a pressure needle system, the actuator is a matrix or a matrix-like arrangement of moveable needles which are mounted in electromagnetic coils, are sprung on the underside and are actuated in rows and columns. If a voltage is applied to an electromagnetic coil of this arrangement, the needle moves out of the coil and presses against the sensory elements in the driver's hand. The movement can take place from the home state into a static final state which is an alternative thereto; or a continuous vibration of the needles or some of the needles can be generated. The driver then senses a pressure or a slight tickling effect which is interpreted as an information signal. In response, the driver can exert a counterpressure on the needles which have been pushed forward and as a result can bring about an induction current in the coils, or, in the case of a vibration movement, can impede the vibration in such a way that the flow of an induction current is also changed here. The voltage which is induced in this way is detected and evaluated as a sensor signal in order to generate, for example, a visual display or even to change an operating function of the vehicle.

In an extension needle system, the needles are laterally tilted so that the skin of the hand resting on them is slightly extended. The driver thus senses a change in the surface structure of the object, for example the steering wheel. This change is transmitted as a signal. The technical embodiment corresponds otherwise essentially to the pressure needle system. If a pressure is exerted on the needles in the extension needle system, voltages are thus also induced here in the elements which bring about the orientation of the needles, and said voltages can trigger corresponding reactions of the system.

In an eccentric system, a motor-operated, rotating eccentric is present as the actuator. The eccentric, actually a wheel with an axis of rotation which is arranged outside the center point, may be a ring or a disk with a certain unbalance or asymmetry. Such an eccentric can be integrated, for example, in the steering wheel. By means of the speed of rotation of the drive, the stimulation impression which is conveyed (vibration frequency) of the eccentric can be changed.

The active component of a steering wheel which is provided with an eccentric is preferably composed of an elastic material, a plastic or rubber or the like, by means of which the vibrations which are caused by the irregular circulation of the eccentric can be sufficiently transmitted to the outside onto the skin or musculature of the hand of the driver and which can easily be deformed or compressed. In this embodiment also there is preferably provision that when an external pressure is exerted on the vibrating active region of the eccentric and there is an impediment of the eccentric movement which is caused by this, the corresponding sensor signal is transmitted to the system and as a consequence of this a function which relates to the vehicle can be triggered.

BRIEF DESCRIPTION OF THE SEVERAL VIEWS OF THE DRAWINGS

A more precise description of exemplary embodiments will be given with reference to FIGS. 1 to 3, of which:

FIG. 1 shows a diagram of a steering wheel with an eccentric device,

FIG. 2 shows a diagram of an arrangement of movable needles, and

FIG. 3 shows a basic diagram of the means of actuating the haptic information element.

DETAILED DESCRIPTION OF THE INVENTION

In FIG. 1, the steering wheel of a vehicle is represented diagrammatically. The steering wheel rim 1 is connected to the steering wheel hub 2 by means of webs, spokes or the like, as is customary. Vibration elements 3—shown here by dashed lines as a concealed contour—are present in the steering wheel rim 1 and are supplied with voltage via electrical feed lines 4. These vibration elements 3 may be components which are known per se, which are each provided with an eccentric or with a rotor which has unbalance, and which generate vibrations.

The active region 5 of the vibration element in which the surface or side face of the eccentric is emphasized in a periodically stronger or weaker fashion during a rotation or in which perceptible vibrations are transmitted to an external surface of the vibration element, is arranged in each case in such a way that the vibrations and their changes in frequency are sensed clearly when the steering wheel is gripped. In the example in FIG. 1 there are two vibration elements present, but basically any desired number is possible.

The actual vibration element 3 may be covered with respect to the external surface of the steering wheel rim by means of a deformable, in particular elastic, material to clad the steering wheel rim 1, through which material the vibrations can be transmitted to the outside. Instead of this it is also possible to provide an opening or a slot in the steering wheel rim instead of the respective eccentric.

The vibration frequency of the vibration element is preferably set and changed electronically. Braking the vibrations or the rotation of the eccentric by means of the driver's hand results in a changed power drain which is detected in an evaluation circuit and, after having been interpreted as a switching command, can be converted into a change in a function or setting of the vehicle.

The described arrangement is only one possible example of an embodiment of the eccentric system which is described further above. Instead of the steering wheel it is possible to equip a grip or some other control device or switching device with it.

FIG. 2 is a diagram of an arrangement of movable needles which, for example, can be integrated into the outer surface of a steering wheel rim instead of the vibration elements. The needles 6 are provided with magnets 7 which are moved in the magnetic field of a respective coil 8 of an electrical conductor, in particular made to vibrate.

In order to generate a restoring force or to adapt a resonant frequency, spring elements are preferably provided which are indicated in FIG. 2 by springs 9 which are shown in simplified form. The precise configuration of such an arrangement for which other driving means are possible, for example a piezoelectric excitation, can be adapted, on the basis of the relevant specialist knowledge, to the requirements in accordance with the respective steering wheel, grip or switching lever.

When a pressure needle system or an extension needle system is implemented, a small region of the outside of the steering wheel rim way be provided with a matrix-like arrangement of the miniaturized needles. In each case one of these arrangements composed of needles is preferably mounted in regions of the steering wheel in which the driver usually grips the steering wheel in the basic position when traveling straight ahead, for example between the positions which correspond to two o'clock and three o'clock or nine o'clock and ten o'clock on the dial of an analog clock.

FIG. 3 is a basic diagram of the means of actuation. The data records are transmitted via a network 10. A transformer 12 (interface) receives the data and makes it available to the programmable processing module 14. The processing module 14 processes the transmitted information using the memory 11. The memory 11 contains all the parameters and data necessary to operate the interactive haptic information element or control element, for example the driver-specific stimulation threshold, vibration rhythms and the like, and makes it available at least to one actuator driver 15 which is present, and if appropriate to at least one sensor driver 16 which is present.

An actuator driver 15 permits the haptic element 17 to be controlled; in the case of matrix systems an actuator driver performs, in particular, the actuation of rows and columns of the arrangement. At least one sensor driver 16 may be present in order to transmit the driver information received from the haptic element 17, for example a pressure which is exerted or an electrical skin resistance, into the processing module 14. In matrix systems it performs the interrogation of rows and columns.

The voltages which are necessary to operate the interactive haptic information element are transmitted and prepared from the on-board voltage system of the vehicle via an on-board voltage system module 13. The voltage supply is indicated in FIG. 3 by single branching arrows, while the contoured arrows which are not filled in represent the transmission of information.

The information element may be connected in an arrangement to at least one device of the vehicle which is provided for generating an information signal which serves to actuate the means of the information element which stimulate the sense of touch. Such a device is, in particular, a sensor or detector from the group of distance radar for monitoring the distance from a vehicle traveling in front or traveling behind, distance radar for the distance from an edge of the roadway, a load change detector, a frost detector and a biometric sensor for monitoring the driver.

An electronic circuit unit, which permits operating parameters of the information element to be matched to the respective driver, is preferably provided. It is thus possible to determine, in particular, an individual stimulation threshold of a driver and to adapt the level of effectiveness of the means of the information element which stimulate the sense of touch thereto. The reaction of the driver to the haptic stimulations can be programmed into the system in such a way that the necessary stimulation intensity can be set individually.

The invention claimed is:

1. A control element for vehicles, comprising:
an operator control element for controlling or for switching a vehicle or vehicle component,
means for transmitting information about a state of the vehicle or traffic to a driver, the means for transmitting being mounted on or in the operator control element so as to be at least temporarily contactable by the driver and comprising stimulating means for mechanically, chemically or electrically stimulating the driver's sense of touch, and
an electronic circuit unit provided for determining an individual stimulation threshold of a driver and adapting thereto a level of effectiveness of the stimulating means.

2. The control element according to claim 1, further comprising means for transmitting stimulation signals, which stimulate a sense of touch, as warning signals or information signals with a variable strength when predefined conditions occur.

3. The control element according to claim 2, wherein the vehicle further comprises a steering wheel, the steering wheel comprising stimulating means arranged to stimulate a sense of touch to at least one hand in contact with the steering wheel.

4. The control element according to claim 1, wherein the vehicle further comprises a steering wheel, the steering wheel comprising the stimulating means arranged to stimulate a sense of touch to at least one hand in contact with the steering wheel.

5. The control element according to claim 4, wherein the stimulating means further comprise a sensor function arranged to convert a haptic effect or an exerted pressure into electronically processed signals.

6. The control element according to claim 1, wherein the stimulating means further comprise a sensor function arranged to convert a haptic effect or an exerted pressure into electronically processed signals.

7. The control element according to claim 6, wherein the stimulating means further comprises a matrix-like arrangement of moveable needles mounted in electronic coils, said moveable needles arranged so as to spring on an underside and actuated in rows and columns.

8. The control element according to claim 6, wherein the stimulating means further comprises a matrix-like arrangement of laterally tiltable needles which are actuated in rows and columns.

9. The control element according to claim 6, wherein the stimulating means further comprises a motor-operated, rotating eccentric arranged to generate a stimulation impression of a vibration.

10. The control element according to claim 6, wherein the stimulating means comprise a matrix-like arrangement of electrodes which actuated in rows and columns and to which different electrical potentials are applied.

11. The control element according to claim 1, wherein the stimulatinig means further comprises a matrix-like arrangement of moveable needles mounted in electronic coils, said moveable needles arranged so as to spring on an underside and actuated in rows and columns.

12. The control element according to claim 1, wherein the stimulating means further comprises a matrix-like arrangement of laterally tiltable needles which are actuated in rows and columns.

13. The control element according to claim 1, wherein the stimulating means further comprises a motor-operated, rotating eccentric arranged to generate a stimulation impression of a vibration.

14. The control element according to claim 1, wherein the stimulating means comprise a matrix-like arrangement of electrodes which are actuated in rows and columns and to which different electrical potentials are applied.

15. The control element according to claim 14, further comprising at least one actuation signal generating means coupled to the stimulating means so as to provide the actuation signal to the stimulating means, the generating means comprising a sensor comprising at least one of distance radar for detecting distance from vehicles traveling ahead or behind, distance radar for detecting distance from an edge of a roadway, load change detector, frost sensor, and biometric sensor for monitoring a driver.

16. The control element according to claim 14, further comprising an electronic circuit unit provided for determining an individual stimulation threshold of a driver and adapting thereto a level of effectiveness of the stimulating means.

17. The control element according to claim 1, further comprising at least one actuation signal generating means coupled to the stimulating means so as to provide the actuation signal to the stimulating means, the generating means comprising a sensor comprising at least one of distance radar for detecting distance from vehicles traveling ahead or behind, distance radar far detecting distance from an edge of a roadway, load change detector, frost sensor, and biometric sensor for monitoring a driver.

* * * * *